US008546507B2

(12) United States Patent
Lavallee et al.

(10) Patent No.: US 8,546,507 B2
(45) Date of Patent: Oct. 1, 2013

(54) SILICONE POLYOXAMIDE PROCESS ADDITIVES FOR HIGH CLARITY APPLICATIONS

(75) Inventors: Claude Lavallee, Maplewood, MN (US); Audrey A. Sherman, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 180 days.

(21) Appl. No.: 13/129,722

(22) PCT Filed: Nov. 20, 2009

(86) PCT No.: PCT/US2009/065233
§ 371 (c)(1),
(2), (4) Date: May 17, 2011

(87) PCT Pub. No.: WO2010/077477
PCT Pub. Date: Jul. 8, 2010

(65) Prior Publication Data
US 2011/0262672 A1    Oct. 27, 2011

Related U.S. Application Data

(60) Provisional application No. 61/138,255, filed on Dec. 17, 2008.

(51) Int. Cl.
*C08G 77/04*    (2006.01)

(52) U.S. Cl.
USPC .............................................. 528/26; 528/38

(58) Field of Classification Search
USPC ...................................................... 528/38, 26
See application file for complete search history.

(56) References Cited

U.S. PATENT DOCUMENTS

| | | | |
|---|---|---|---|
| 3,890,269 A | 6/1975 | Martin | |
| 4,032,502 A | 6/1977 | Lee et al. | |
| 4,107,258 A | 8/1978 | Angell, Jr. et al. | |
| 4,535,113 A | 8/1985 | Foster et al. | |
| 4,661,577 A | 4/1987 | Jo Lane et al. | |
| 4,740,341 A | 4/1988 | Chu | |
| 4,857,593 A | 8/1989 | Leung et al. | |
| 5,026,890 A | 6/1991 | Webb et al. | |
| 5,100,960 A | 3/1992 | Grigo et al. | |
| 5,214,119 A | 5/1993 | Leihr et al. | |
| 5,225,511 A | 7/1993 | Durfee | |
| 5,227,448 A | 7/1993 | Durfee | |
| 5,276,122 A | 1/1994 | Aoki et al. | |
| 5,356,585 A | 10/1994 | Romenesko | |
| 5,403,891 A | 4/1995 | Romenesko | |
| 5,461,134 A | 10/1995 | Leir et al. | |
| 5,512,650 A | 4/1996 | Leir et al. | |
| 5,549,948 A | 8/1996 | Blong et al. | |
| 5,708,085 A | 1/1998 | Hauenstein et al. | |
| 5,789,473 A | 8/1998 | Hauenstein et al. | |
| 5,986,003 A | 11/1999 | Lee et al. | |
| 6,013,217 A | 1/2000 | Hauenstein et al. | |
| 6,355,759 B1 | 3/2002 | Sherman et al. | |
| 6,531,620 B2 | 3/2003 | Brader et al. | |
| 6,806,313 B2 | 10/2004 | Couturier | |
| 7,105,233 B2 | 9/2006 | Bechthold et al. | |
| 2007/0148474 A1 | 6/2007 | Leir et al. | |
| 2007/0149745 A1 | 6/2007 | Leir et al. | |
| 2007/0177272 A1 | 8/2007 | Benson et al. | |
| 2007/0177273 A1 | 8/2007 | Benson et al. | |
| 2007/0232772 A1 | 10/2007 | Ziche et al. | |
| 2007/0297736 A1 | 12/2007 | Sherman et al. | |
| 2008/0199620 A1 | 8/2008 | Sherman et al. | |
| 2008/0318065 A1* | 12/2008 | Sherman et al. | 428/446 |

FOREIGN PATENT DOCUMENTS

| | | |
|---|---|---|
| DE | 4122556 | 1/1993 |
| EP | 0 469 778 | 2/1992 |
| EP | 1 211 277 | 11/2001 |
| EP | 1 862 501 | 12/2007 |
| GB | 1 460 128 | 12/1976 |
| JP | 7145277 | 6/1995 |
| JP | 2001191364 | 7/2001 |
| JP | 2003041231 | 2/2003 |
| WO | 2006/069639 | 7/2006 |

OTHER PUBLICATIONS

ASTM Test Method D1003-95, "Standard Test Method for Haze and Luminous Transmittance of Transparent Plastics,", pp. 197-201 (1995).
ASTM Test Method D790-07, "Standard Test Methods for Flexural Properties of Unreinforced and Reinforced Plastics and Electrical Insulating Materials,", pp. 1-11 (2007).
ASTM Test Method D3641, "Standard Practice for Injection Molding Test Specimens of Thermoplastic Molding and Extrusion Materials", pp. 1-9,(2010).

* cited by examiner

*Primary Examiner* — Kuo-Liang Peng
(74) *Attorney, Agent, or Firm* — C. Michael Geise

(57) ABSTRACT

There is provided a silicone-polyoxamide process additive for use in high clarity applications, articles made using the silicone-polyoxamide process additive, and methods for making these articles.

15 Claims, No Drawings

SILICONE POLYOXAMIDE PROCESS ADDITIVES FOR HIGH CLARITY APPLICATIONS

CROSS REFERENCE TO RELATED APPLICATIONS

This application is a national stage filing under 35 U.S.C. 371 of PCT/US2009/065233, filed Nov. 20, 2009, which claims priority to U.S. Provisional Application No. 61/138,255, filed Dec. 17, 2008, the disclosures of which are incorporated by reference in their entirety herein.

TECHNICAL FIELD

The present disclosure relates to silicone-polyoxamide process additives (PA) for high clarity applications. The present disclosure also relates to extruded articles made using these silicone-polyoxamide PA's and methods for making these articles.

BACKGROUND

Thermoplastic polymers, such as polypropylene (PP), polyethylene terephthalate (PET), and styrene-butadiene copolymer (SBC), are used in film and packaging applications. One such application includes multilayer films used in food packaging. Some polymers used in food packaging applications, such as blow molded bottles used for bottling water, are preferentially higher in clarity than other polymers.

PET is currently widely used for high clarity applications because of its relatively low level of melt fracture due to the blow molding process. Blow molded PP and SBC films exhibit surface haze due to melt fracture that occurs during the blow molding or film extrusion process. Conventional process additives (PA's), such as fluoropolymer PA's, siloxane PA's, and the like, used in blow molding PP and SBC film extrusion provide a reduction in melt fracture and, thereby, surface haze. However, these conventional PA's form droplets within the thermoplastic film layer (PP and SBC layer), which result in light scattering that creates internal haze.

PP has a refractive index ranging from 1.45 to 1.5. SBC has a refractive index ranging from 1.5 to 1.59.

Siloxane PA's are known as potential process additives that can be used in thermoplastics for extrusion applications. Siloxane polymers used in these siloxane PA's have unique properties derived mainly from the physical and chemical characteristics of the siloxane bond. These properties include low glass transition temperature, thermal and oxidative stability, resistance to ultraviolet radiation, low surface energy and hydrophobicity, high permeability to many gases, and biocompatibility. The siloxane polymers, however, often lack tensile strength. The resulting siloxane PA's are typically fluidic with very low glass transition (Tg) values at room temperature, and flow at room temperature and above without the need for elevated temperatures. Because of their fluidity at ambient conditions, these siloxane PA's are difficult to process. For example, these siloxane PA's can not be maintained in pellet form at ambient conditions. This makes it difficult to precisely blend the siloxane PA's with thermoplastics for extrusion applications.

There exists a need for a PA that can be used in thermoplastics in extrusion applications in order to obtain improvements in physical properties, such as haze, viscosity, and the like. There also exists a need for using a PA in thermoplastics in extrusion applications while reducing processing pressure at various processing conditions. There also exists a need for a PA that is easy to handle at ambient conditions and can be used in pellet form for extrusion applications.

SUMMARY

In one aspect, the present disclosure provides a composition comprising a silicone-polyoxamide process additive and a thermoplastic with the proviso that the silicone-polyoxamide process additive is not acrylic modified; where the refractive index difference between the silicone-polyoxamide process additive and the thermoplastic is less than about 0.07; and where the weight percent of silicone-polyoxamide process additive based on the total weight of the composition is an amount effective to reduce extrusion melt defects in the thermoplastic.

In another aspect, the present disclosure provides a composition comprising a silicone-polyoxamide process additive and a thermoplastic with the proviso that the silicone-polyoxamide process additive is not acrylic modified; where the haze is less than 5% at a thickness of 0.60 mm and; where the weight percent of silicone-polyoxamide process additive based on the total weight of the composition is an amount effective to reduce extrusion melt defects in the thermoplastic.

In another aspect, the present disclosure provides a method of making an article comprising one of the previously disclosed compositions. In still another aspect, the present disclosure provides that the method of making the article comprises melt mixing the thermoplastic and the silicone-polyoxamide process additive to form a mixture; and extruding the mixture.

DEFINITIONS

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The terms "a", "an", and "the" are used interchangeably with "at least one" to mean one or more of the elements being described.

As used herein, the term "or" is generally employed in its sense including "and/or" unless the content clearly dictates otherwise.

The term "and/or" means one or all of the listed elements or a combination of any two or more of the listed elements.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "alkoxycarbonyl" refers to a monovalent group of formula —(CO)OR where R is an alkyl group and (CO) denotes a carbonyl group with the carbon attached to the oxygen with a double bond.

The term "aralkyl" refers to a monovalent group of formula —$R^a$—Ar where $R^a$ is an alkylene and Ar is an aryl group. That is, the aralkyl is an alkyl substituted with an aryl.

The term "aralkylene" refers to a divalent group of formula —$R^a$—$Ar^a$— where $R^a$ is an alkylene and $Ar^a$ is an arylene (i.e., an alkylene is bonded to an arylene).

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "aryloxy" refers to a monovalent group of formula —OAr where Ar is an aryl group.

The term "carbonyl" refers to a divalent group of formula —(CO)— where the carbon atom is attached to the oxygen atom with a double bond.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

The term "heteroalkylene" refers to a divalent group that includes at least two alkylene groups connected by a thio, oxy, or —NR— where R is alkyl. The heteroalkylene can be linear, branched, cyclic, or combinations thereof and can include up to 60 carbon atoms and up to 15 heteroatoms. In some embodiments, the heteroalkylene includes up to 50 carbon atoms, up to 40 carbon atoms, up to 30 carbon atoms, up to 20 carbon atoms, or up to 10 carbon atoms. Some heteroalkylenes are polyalkylene oxides where the heteroatom is oxygen.

The term "oxalyl" refers to a divalent group of formula —(CO)—(CO)— where each (CO) denotes a carbonyl group.

The terms "oxalylamino" and "aminoxalyl" are used interchangeably to refer to a divalent group of formula —(CO)—(CO)—NH— where each (CO) denotes a carbonyl.

The term "aminoxalylamino" refers to a divalent group of formula —NH—(CO)—(CO)—$NR^d$— where each (CO) denotes a carbonyl group and $R^d$ is hydrogen, alkyl, or part of a heterocyclic group along with the nitrogen to which they are both attached. In most embodiments, $R^d$ is hydrogen or alkyl. In many embodiments, $R^d$ is hydrogen.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The term "polydiorganosiloxane" refers to a divalent segment of formula

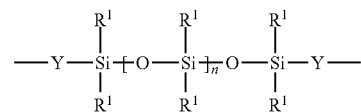

where each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and subscript n is independently an integer of 0 to 1500.

The terms "room temperature" and "ambient temperature" are used interchangeably to mean temperatures in the range of 20° C. to 25° C.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

DETAILED DESCRIPTION OF ILLUSTRATIVE EMBODIMENTS

Mixtures containing silicone-polyoxamide process additives (PA) and thermoplastics, methods of making the mixtures, compositions including the mixtures, articles made using the compositions, and methods of making the articles are provided. The silicone-polyoxamide PA's are mixed with a variety of thermoplastic polymers. The mixtures can be hot melt processable mixtures in that both the silicone-polyoxamide PA's and the thermoplastics can be hot melt processed, i.e., can be processed by heating to a flowable melt state.

In some embodiments, the silicone-polyoxamide PA comprises polydiorganosiloxane polyamide copolymers. Some of these polydiorganosiloxane polyamide copolymers are of an (AB)$_n$ type, which are the condensation reaction product of (a) a diamine having primary or secondary amino groups with (b) a precursor having at least one polydiorganosiloxane segment and at least two dicarboxamido ester groups (preferably oxalylamido ester groups). The copolymers have many of the desirable features of polysiloxanes such as low glass transition temperatures, thermal and oxidative stability, resistance to ultraviolet radiation, low surface energy and hydrophobicity, and high permeability to many gases. Additionally, the copolymers can have improved mechanical strength and elastomeric properties compared to polysiloxanes. At least some of the copolymers are optically clear, have a low refractive index, or both. Accordingly, at least some of the polymeric mixtures have similar properties.

The relative amounts of these components in a given mixture or composition containing the mixture depend upon the particular rheological and mechanical properties sought, as well as the individual components themselves (e.g. the molecular weight of the thermoplastic, the degree of polymerization of the silicone-polyoxamide PA). In general, however preferred compositions contain at least 0.1 percent by weight (wt-%) of the silicone-polyoxamide PA, and no more than 99.9 wt-% of the thermoplastic. In some embodiments, the mixture comprises 5 wt-% of the silicone-polyoxamide PA and 95 wt-% of the thermoplastic. In some embodiments, the mixture comprises 3 wt-% of the silicone-polyoxamide PA and 97 wt-% of the thermoplastic. In some embodiments, the mixture comprises 1 wt-% of the silicone-polyoxamide PA and 99 wt-% of the thermoplastic.

Thermoplastic Component

Thermoplastics are generally materials that flow when heated sufficiently above their glass transition point and become solid when cooled. They may also have elastomeric properties. The thermoplastic component includes but is not limited to hot melt processable thermoplastic polymers (which may be elastomeric or nonelastomeric), such as polypropylene, polystyrene, polyethylene, polyesters and fluoroplastics, or mixtures thereof, excluding silicone-polyoxamide PA's as described herein (e.g., those of Formulas I-a and I-b). By "hot melt processable" it is meant that the polymer will melt and flow at a temperature at which the silicone-polyoxamide PA's of Formulas I-a and I-b will melt and flow.

The thermoplastic may be solvent or melt mixed with the silicone-polyoxamide PA's. The thermoplastic may comprise other additives, fillers, and the like, however it is not a silicone-polyoxamide PA compound of Formulas I-a and I-b.

At use temperature the mixtures generally have at least two domains, one discontinuous and the other continuous, because of the general immiscibility of the silicone-polyoxamide PA component with the thermoplastic. Of course, the mixture may contain more than one silicone-polyoxamide PA compound and more than one thermoplastic.

Thermoplastic materials useful in the present disclosure that are generally considered nonelastomeric include, for example, polyolefins such as polypropylene, low density polyethylene, linear low density polyethylene, very low density polyethylene, medium density polyethylene, high density polyethylene, such as that available under the trade designation DOW HDPE DMDA-8904 NT7 commercially available from DOW Plastics an affiliate of the DOW Chemical Co., Michigan USA, polybutylene, nonelastomeric polyolefin copolymers or terpolymers, such as ethylene/propylene copolymer and blends thereof; ethylene-vinyl acetate copolymers such as that available under the trade designation ELVAX 260, available from DuPont Chemical Co.; ethylene acrylic acid copolymers; ethylene methacrylic acid copolymers such as that available under the trade designation SURLYN 1702, available from DuPont Chemical Co.; polymethylmethacrylate; polystyrene; ethylene vinyl alcohol; polyester; amorphous polyester; polyamides; fluorinated thermoplastics, such a polyvinylidene fluoride and their copolymers (THV), fluorinated ethylene/propylene copolymers and fluorinated ethylene/propylene copolymers; halogenated thermoplastics, such as a chlorinated polyethylene and polyvinyl chloride (PVC). Any single thermoplastic material can be mixed with at least one silicone-polyoxamide PA-containing component. Alternatively, a mixture of thermoplastic materials may be used.

Thermoplastic materials that have elastomeric properties are typically called thermoplastic elastomeric materials. Thermoplastic elastomeric materials are generally defined as materials that act as though they were covalently cross-linked, exhibiting high resilience and low creep, yet flow when heated above their softening point. Thermoplastic elastomeric materials useful in the present invention include, for example, linear, radial, star and tapered styrene-isoprene block copolymers such as that available under the trade designation KRATON D1107P from Shell Chemical Co. of Houston, Tex. and that available under the trade designation EUROPRENE SOL TE 9110 from EniChem Elastomers Americas, Inc. of Houston, Tex.; linear styrene-(ethylene-butylene) block copolymers such as that available under the trade designation KRATON G1657 from Shell Chemical Co.; linear styrene-(ethylene-propylene) block copolymers such as that available under the trade designation KRATON G1657X from Shell Chemical Co.; linear, radial, and star styrene-butadiene block copolymers such as that available under the trade designation KRATON D1118X from Shell Chemical Co. and that available under the trade designation EUROPRENE SOL TE 6205 from EniChem Elastomers Americas, Inc.; polyetheresters such as that available under the trade designation HYTREL G3548 from DuPont, elastomeric ethylene-propylene copolymers; thermoplastic elastomeric polyurethanes such as that available under the trade designation MORTHANE URETHENE PE44-203 from Morton International, Inc., Chicago, Ill.; self-tacky or tackified polyacrylates including $C_3$ to $C_{12}$ alkylesters that may contain other comonomers, such as for example, isooctyl acrylate and from 0 to 20 weight percent acrylic acid; polyvinylethers; poly-α-olefin-based thermoplastic elastomeric materials such as those represented by the formula —(CH$_2$CHR)$_x$ where R is an alkyl group containing 2 to 10 carbon atoms and poly-α-olefins based on metallocene catalysis such as that available under the trade designation ENGAGE EG8200, an ethylene/poly-α-olefin copolymer, available from Dow Plastics Co. of Midland, Mich.

Silicone-Polyoxamide Process Additive Component

Various silicone-polyoxamide PA's are useful in mixtures presently disclosed. These silicone-polyoxamide PA's include linear, polydiorganosiloxane polyamide block copolymers, polydiorganosiloxane urea-containing copolymers, and the like. It is preferable that the presently disclosed silicone-polyoxamide PA's are not acrylic modified.

A linear, polydiorganosiloxane polyamide block copolymer useful in mixtures of the present disclosure contains at least two repeat units of Formula I-a:

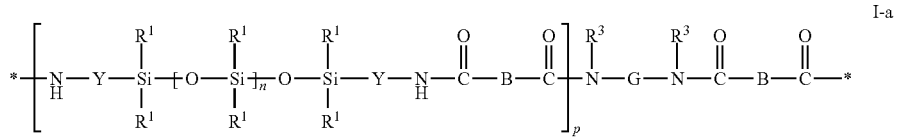

In this formula (I-a), each $R^1$ is independently an alkyl, haloalkyl, aralkyl, alkenyl, aryl, or aryl substituted with an alkyl, alkoxy, or halo. Each Y is independently an alkylene, aralkylene, or a combination thereof. Subscript n is independently an integer of 0 to 1500 and subscript p is an integer of 1 to 10. Group G is a divalent group that is the residue unit that is equal to a diamine of formula $R^3HN$-G-$NHR^3$ minus the two —$NHR^3$ groups (i.e., amino groups) where $R^3$ is hydrogen, alkyl, or forms a heterocyclic group when taken together with G and with the nitrogen to which it is attached. Each group B is independently a covalent bond, an alkylene of 4-20 carbons, an aralkylene, an arylene, or a combination thereof. When each group B is a covalent bond, the polydiorganosiloxane polyamide block copolymer of Formula I-a is referred to as a polydiorganosiloxane polyoxamide block copolymer, and preferably as the Formula I-b shown below. Each asterisk (*) indicates the position of attachment of the repeating unit to another group such as another repeat unit of Formula I-a.

A preferred linear, polydiorganosiloxane polyamide block copolymer useful in presently disclosed mixtures contains at least two repeat units of Formula I-b:

be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some embodiments, in some repeat units of Formula I (I-a or I-b), at least 40 percent, and preferably at least 50 percent, of the $R^1$ groups are phenyl, methyl, or combinations thereof. For example, at least 60 percent, at least 70 percent, at least 80 percent, at least 90 percent, at least 95 percent, at least 98 percent, or at least 99 percent of the $R^1$ groups can be phenyl, methyl, or combinations thereof. In some embodiments, in some repeat units of Formula I (I-a or I-b), at least 40 percent, and preferably at least 50 percent, of the $R^1$ groups

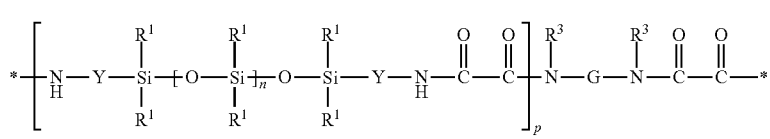

In this Formula I-b, each $R^1$ is independently an alkyl, haloalkyl, aralkyl, alkenyl, aryl, or aryl substituted with an alkyl, alkoxy, or halo. Each Y is independently an alkylene, aralkylene, or a combination thereof. Subscript n is independently an integer of 0 to 1500 and the subscript p is an integer of 1 to 10. Group G is a divalent group that is the residue unit that is equal to a diamine of formula $R^3HN$-G-$NHR^3$ minus the two —$NHR^3$ groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine or the like). Each asterisk (*) indicates a site of attachment of the repeat unit to another group in the copolymer such as, for example, another repeat unit of Formula I-b.

Suitable alkyl groups for $R^1$ in Formula I (I-a or I-b) typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula I (I-a or I-b) is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula I (I-a or I-b) is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula I (I-a or I-b) is a residual unit that is equal to a diamine compound of formula $R^3HN$-G-$NHR^3$ minus the two amino groups (i.e., —$NHR^3$ groups). The diamine can have primary or secondary amino groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine). In most embodiments, $R^3$ is hydrogen or an alkyl. In many embodiments, both of the amino groups of the diamine are primary amino groups (i.e., both $R^3$ groups are hydrogen) and the diamine is of formula $H_2N$-G-$NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines of Formula II, which are described below, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

In preferred embodiments, the polydiorganosiloxane polyamide is a polydiorganosiloxane polyoxamide. The polydiorganosiloxane polyamide tends to be free of groups having a formula —$R^a$—(CO)—NH— where $R^a$ is an alkylene. All of the carbonylamino groups along the backbone of the copolymeric material are part of an oxalylamino group (i.e., the —(CO)—(CO)—NH— group). That is, any carbonyl group along the backbone of the copolymeric material is bonded to another carbonyl group and is part of an oxalyl group. More specifically, the polydiorganosiloxane polyamide has a plurality of aminoxalylamino groups.

The polydiorganosiloxane polyamide is a linear, block copolymer and can be an elastomeric material. Unlike many of the known polydiorganosiloxane polyamides that are generally formulated as brittle solids or hard plastics, the polydiorganosiloxane polyamides can be formulated to include greater than 50 weight percent polydiorganosiloxane segments based on the weight of the copolymer. The weight percent of the diorganosiloxane in the polydiorganosiloxane polyamides can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyamides. Higher amounts of the polydiorganosiloxane can be used to prepare elastomeric materials with lower modulus while maintaining reasonable strength.

Some of the polydiorganosiloxane polyamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to 350° C. Additionally, the copolymers can often be heated at a temperature such as 250° C. for 1 hour in air without apparent degradation as determined by no detectable loss of mechanical strength upon cooling.

Certain embodiments of the copolymeric material of Formula I (I-a or I-b) can be optically clear. As used herein, the term "optically clear" refers to a material that is clear to the human eye. An optically clear copolymeric material often has a luminous transmission of at least 90 percent, a haze of less than 2 percent, and opacity of less than about 1 percent in the 400 to 700 nm wavelength range. Both the luminous transmission and the haze can be determined using, for example, the method of ASTM-D 1003-95.

Additionally, certain embodiments of the copolymeric material of Formula I (I-a or I-b) can have a low refractive index. As used herein, the term "refractive index" refers to the absolute refractive index of a material (e.g., copolymeric material) and is the ratio of the speed of electromagnetic radiation in free space to the speed of the electromagnetic radiation in the material of interest. The electromagnetic radiation is white light. The index of refraction is measured using an Abbe refractometer, available commercially, for example, from Fisher Instruments of Pittsburgh, Pa. The measurement of the refractive index can depend, to some extent, on the particular refractometer used. The copolymeric material usually has a refractive index in the range of 1.41 to 1.60.

The polydiorganosiloxane polyamides are soluble in many common organic solvents such as, for example, toluene, tetrahydrofuran, dichloromethane, aliphatic hydrocarbons (e.g., alkanes such as hexane), or mixtures thereof.

Methods of Making Polydiorganosiloxane Polyamide Copolymers

The linear block copolymers having repeat units of Formula I (I-a or I-b) can be prepared, for example, as represented in Reaction Scheme A.

Reaction Scheme A

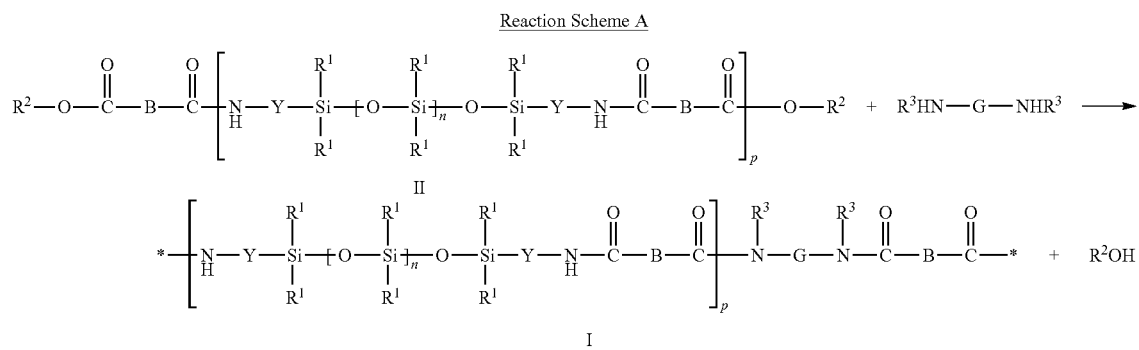

In this reaction scheme, a precursor of Formula I (I-a or I-b) is combined under reaction conditions with a diamine having two primary or secondary amino groups, two secondary amino groups, or one primary amino group and one secondary amino group. The diamine is usually of formula $R^3HN\text{-}G\text{-}NHR^3$. The $R^2OH$ by-product is typically removed from the resulting polydiorganosiloxane polyamide.

The diamine $R^3HN\text{-}G\text{-}NHR^3$ in Reaction Scheme A has two amino groups (i.e., $-NHR^3$). Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., the diamine is piperazine or the like). In most embodiments, $R^3$ is hydrogen or alkyl. In many embodiments, the diamine has two primary amino groups (i.e., each $R^3$ group is hydrogen) and the diamine is of formula $H_2N\text{-}G\text{-}NH_2$. The portion of the diamine exclusive of the two amino groups is referred to as group G in Formula I (I-a or I-b).

The diamines are sometimes classified as organic diamines or polydiorganosiloxane diamines with the organic diamines including, for example, those selected from alkylene diamines, heteroalkylene diamines, arylene diamines, aralkylene diamines, or alkylene-aralkylene diamines. The diamine has only two amino groups so that the resulting polydiorganosiloxane polyamides are linear block copolymers that are often elastomeric, molten at elevated temperatures, and soluble in some common organic solvents. The diamine is free of a polyamine having more than two primary or secondary amino groups. Tertiary amines that do not react with the precursor of Formula I (I-a or I-b) can be present. Additionally, the diamine is free of any carbonylamino group. That is, the diamine is not an amide.

Exemplary polyoxyalkylene diamines (i.e., G is a heteroalkylene with the heteroatom being oxygen) include, but are not limited to, those commercially available from Huntsman, The Woodlands, Tex. under the trade designation JEFFAMINE D-230 (i.e., polyoxypropylene diamine having an average molecular weight of 230 g/mole), JEFFAMINE D-400 (i.e., polyoxypropylene diamine having an average molecular weight of 400 g/mole), JEFFAMINE D-2000 (i.e., polyoxypropylene diamine having an average molecular weight of 2,000 g/mole), JEFFAMINE HK-511 (i.e., polyetherdiamine with both oxyethylene and oxypropylene groups and having an average molecular weight of 220 g/mole), JEFFAMINE ED-2003 (i.e., polypropylene oxide capped polyethylene glycol having an average molecular weight of 2,000 g/mole), and JEFFAMINE EDR-148 (i.e., triethyleneglycol diamine).

Exemplary alkylene diamines (i.e., G is a alkylene) include, but are not limited to, ethylene diamine, propylene diamine, butylene diamine, hexamethylene diamine, 2-methylpentamethylene 1,5-diamine (i.e., commercially available from DuPont, Wilmington, Del. under the trade designation DYTEK A), 1,3-pentane diamine (commercially available from DuPont under the trade designation DYTEK EP), 1,4-cyclohexane diamine, 1,2-cyclohexane diamine (commercially available from DuPont under the trade designation DHC-99), 4,4'-bis(aminocyclohexyl)methane, and 3-aminomethyl-3,5,5-trimethylcyclohexylamine.

Exemplary arylene diamines (i.e., G is an arylene such as phenylene) include, but are not limited to, m-phenylene diamine, o-phenylene diamine, and p-phenylene diamine. Exemplary aralkylene diamines (i.e., G is an aralkylene such as alkylene-phenyl) include, but are not limited to 4-aminomethyl-phenylamine, 3-aminomethyl-phenylamine, and 2-aminomethyl-phenylamine. Exemplary alkylene-aralkylene diamines (i.e., G is an alkylene-aralkylene such as alkylene-phenylene-alkylene) include, but are not limited to, 4-aminomethyl-benzylamine, 3-aminomethyl-benzylamine, and 2-aminomethyl-benzylamine.

The precursor of Formula II in Reaction Scheme A has at least one polydiorganosiloxane segment and at least two oxalylamino groups. Group $R^1$, group Y, subscript n, and subscript p are the same as described for Formula I (I-a or I-b). Each group $R^2$ is independently an alkyl, haloalkyl, aryl, or aryl substituted with an alkyl, alkoxy, halo, or alkoxycarbonyl. The precursor of Formula II can include a single compound (i.e., all the compounds have the same value of p and n) or can include a plurality of compounds (i.e., the compounds have different values for p, different values for n, or different values for both p and n). Precursors with different n values have siloxane chains of different length. Precursors having a p value of at least 2 are chain extended.

In some embodiments, the precursor is a mixture of a first compound of Formula II with subscript p equal to 1 and a second compound of Formula II with subscript p equal to at least 2. The first compound can include a plurality of different compounds with different values of n. The second compound can include a plurality of compounds with different values of p, different values of n, or different values of both p and n. Mixtures can include at least 50 weight percent of the first compound of Formula II (i.e., p is equal to 1) and no greater than 50 weight percent of the second compound of Formula II (i.e., p is equal to at least 2) based on the sum of the weight of the first and second compounds in the mixture. In some mixtures, the first compound is present in an amount of at least 55 weight percent, at least 60 weight percent, at least 65 weight percent, at least 70 weight percent, at least 75 weight percent, at least 80 weight percent, at least 85 weight percent, at least 90 weight percent, at least 95 weight percent, or at least 98 weight percent based on the total amount of the compounds of Formula II. The mixtures often contain no greater than 50 weight percent, no greater than 45 weight percent, no greater than 40 weight percent, no greater than 35 weight percent, no greater than 30 weight percent, no greater than 25 weight percent, no greater than 20 weight percent, no greater than 15 weight percent, no greater than 10 weight percent, no greater than 5 weight percent, or no greater than 2 weight percent of the second compound.

Different amounts of the chain-extended precursor of Formula II in the mixture can affect the final properties of the elastomeric material of Formula I (I-a or I-b). That is, the amount of the second compound of Formula II (i.e., p equal to at least 2) can be varied advantageously to provide elastomeric materials with a range of properties. For example, a higher amount of the second compound of Formula II can alter the melt rheology (e.g., the elastomeric material can flow easier when present as a melt), alter the softness of the elastomeric material, lower the modulus of the elastomeric material, or a combination thereof.

Reaction Scheme A can be conducted using a plurality of precursors of Formula II, a plurality of diamines, or a combination thereof. A plurality of precursors having different average molecular weights can be combined under reaction conditions with a single diamine or with multiple diamines. For example, the precursor of Formula II may include a mixture of materials with different values of n, different values of p, or different values of both n and p. The multiple diamines can include, for example, a first diamine that is an organic diamine and a second diamine that is a polydiorganosiloxane diamine. Likewise, a single precursor can be combined under reaction conditions with multiple diamines.

For certain embodiments, the molar ratio of the precursor of Formula II to the diamine is often 1:1. For example, the molar ratio is often less than or equal to 1:0.80, less than or equal to 1:0.85, less than or equal to 1:0.90, less than or equal to 1:0.95, or less than or equal to 1:1. The molar ratio is often greater than or equal to 1:1.05, greater than or equal to 1:1.10, or greater than or equal to 1:1.15. For example, the molar ratio can be in the range of 1:0.80 to 1:1.20, in the range of 1:0.80 to 1:1.15, in the range of 1:0.80 to 1:1.10, in the range of 1:0.80 to 1:1.05, in the range of 1:0.90 to 1:1.10, or in the range of 1:0.95 to 1:1.05.

For certain embodiments, the molar ratio of the precursor of Formula II to the diamine is less than 1:1.20 or greater than 1:0.80. For example, it can be 1:0.50, 1:0.55, 1:0.60, 1:0.65, 1:0.70, or 1:0.75, or it can be 1:1.25, 1:1.30, or 1:1.35. For example, the molar ratio can be in the range of less than 1:1.20 down to and including 1:2.00. Alternatively, it can be in the range of greater than 1:0.80 up to and including 1:0.50.

Varying the molar ratio can be used, for example, to alter the overall molecular weight, which can effect the rheology of the resulting copolymers. Additionally, varying the molar ratio can be used to provide oxalylamino-containing end groups or amino end groups, depending upon which reactant is present in molar excess.

The condensation reaction of the precursor of Formula II with the diamine (i.e., Reaction Scheme A) is often conducted at room temperature or at elevated temperatures such as at temperatures up to 250° C. For example, the reaction often can be conducted at room temperature or at temperatures up to 100° C. In other examples, the reaction can be conducted at a temperature of at least 100° C., at least 120° C., or at least 150° C. For example, the reaction temperature is often in the range of 100° C. to 220° C., in the range of 120° C. to 220° C., or in the range of 150° C. to 200° C. The condensation reaction is often complete in less than 1 hour, in less than 2 hours, in less than 4 hours, in less than 8 hours, or in less than 12 hours.

Reaction Scheme A can occur in the presence or absence of a solvent. Suitable solvents usually do not react with any of the reactants or products of the reactions. Additionally, suitable solvents are usually capable of maintaining all the reactants and all of the products in solution throughout the polymerization process. Exemplary solvents include, but are not limited to, toluene, tetrahydrofuran, dichloromethane, aliphatic hydrocarbons (e.g., alkanes such as hexane), or mixtures thereof.

Any solvent that is present can be stripped from the resulting polydiorganosiloxane polyamide at the completion of the reaction. Solvents that can be removed under the same conditions used to remove the alcohol by-product are often preferred. The stripping process is often conducted at a temperature of at least 100° C., at least 125° C., or at least 150° C. The stripping process is typically at a temperature less than 300° C., less than 250° C., or less than 225° C.

Conducting Reaction Scheme A in the absence of a solvent can be desirable because only the volatile by-product, $R^2OH$, needs to be removed at the conclusion of the reaction. Additionally, a solvent that is not compatible with both reactants and the product can result in incomplete reaction and a low degree of polymerization.

Any suitable reactor or process can be used to prepare the copolymeric material according to Reaction Scheme A. The reaction can be conducted using a batch process, semi-batch process, or a continuous process. Exemplary batch processes can be conducted in a reaction vessel equipped with a mechanical stirrer such as a Brabender mixer, provided the product of the reaction is in a molten state has a sufficiently low viscosity to be drained from the reactor. Exemplary semi-batch process can be conducted in a continuously stirred tube, tank, or fluidized bed. Exemplary continuous processes can be conducted in a single screw or twin screw extruder such as a wiped surface counter-rotating or co-rotating twin screw extruder.

In many processes, the components are metered and then mixed together to form a reaction mixture. The components can be metered volumetrically or gravimetrically using, for example, a gear, piston or progressing cavity pump. The components can be mixed using any known static or dynamic method such as, for example, static mixers, or compounding mixers such as single or multiple screw extruders. The reaction mixture can then be formed, poured, pumped, coated, injection molded, sprayed, sputtered, atomized, stranded or sheeted, and partially or completely polymerized. The partially or completely polymerized material can then optionally be converted to a particle, droplet, pellet, sphere, strand, ribbon, rod, tube, film, sheet, coextruded film, web, nonwoven, microreplicated structure, or other continuous or discrete shape, prior to the transformation to solid polymer. Any of these steps can be conducted in the presence or absence of applied heat. In one exemplary process, the components can be metered using a gear pump, mixed using a static mixer, and injected into a mold prior to solidification of the polymerizing material.

The polydiorganosiloxane-containing precursor of Formula II in Reaction Scheme A can be prepared by any known method. In some embodiments, this precursor is prepared according to Reaction Scheme B.

Reaction Scheme B

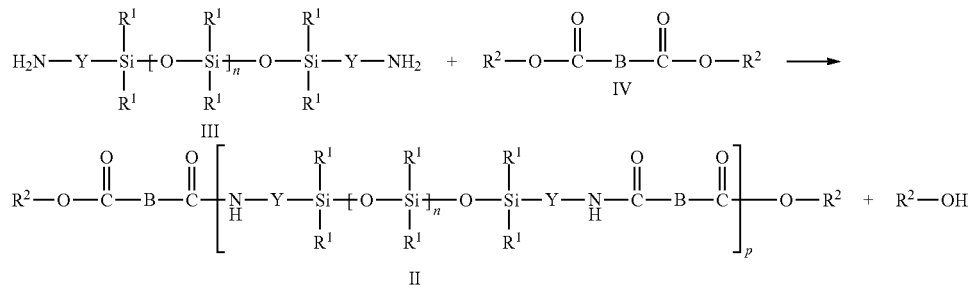

A polydiorganosiloxane diamine of Formula III (p moles) is reacted with a molar excess of an oxalate of Formula IV (greater than p+1 moles) under an inert atmosphere to produce the polydiorganosiloxane-containing precursor of Formula II and $R^2$—OH by-product. In this reaction, $R^1$, Y, n, and p are the same as previously described for Formula I (I-a or I-b). Each $R^2$ in Formula IV is independently an alkyl, haloalkyl, aryl, or aryl substituted with an alkyl, alkoxy, halo, or alkoxycarbonyl. The preparation of the precursor of Formula II according to Reaction Scheme B is further described in Applicant's Assignee's copending U.S. Patent Publ. No. 2007/149745 A1 (Leir et al.), filed on Dec. 23, 2005.

The polydiorganosiloxane diamine of Formula IV in Reaction Scheme B can be prepared by any known method and can have any suitable molecular weight, such as an average molecular weight in the range of 700 to 150,000 g/mole. Suitable polydiorganosiloxane diamines and methods of making the polydiorganosiloxane diamines are described, for example, in U.S. Pat. No. 3,890,269 (Martin), U.S. Pat. No. 4,661,577 (Jo Lane et al.), U.S. Pat. No. 5,026,890 (Webb et al.), U.S. Pat. No. 5,276,122 (Aoki et al.), U.S. Pat. No. 5,214,119 (Leir et al.), U.S. Pat. No. 5,461,134 (Leir et al.), U.S. Pat. No. 5,512,650 (Leir et al.), and U.S. Pat. No. 6,355,759 (Sherman et al.), incorporated herein by reference in their entirety. Some polydiorganosiloxane diamines are commercially available, for example, from Shin Etsu Silicones of America, Inc., Torrance, Calif. and from Gelest Inc., Morrisville, Pa.

A polydiorganosiloxane diamine having a molecular weight greater than 2,000 g/mole or greater than 5,000 g/mole can be prepared using the methods described in U.S. Pat. No. 5,214,119 (Leir et al.), U.S. Pat. No. 5,461,134 (Leir et al.), and U.S. Pat. No. 5,512,650 (Leir et al.). One of the described methods involves combining under reaction conditions and under an inert atmosphere (a) an amine functional end blocker of the following formula

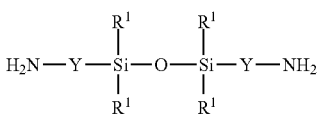

where Y and $R^1$ are the same as defined for Formula I (I-a or I-b); (b) sufficient cyclic siloxane to react with the amine functional end blocker to form a polydiorganosiloxane diamine having a molecular weight less than 2,000 g/mole; and (c) an anhydrous aminoalkyl silanolate catalyst of the following formula

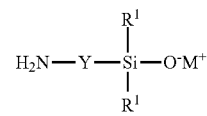

where Y and $R^1$ are the same as defined in Formula I (I-a or I-b) and $M^+$ is a sodium ion, potassium ion, cesium ion, rubidium ion, or tetramethylammonium ion. The reaction is continued until substantially all of the amine functional end blocker is consumed and then additional cyclic siloxane is added to increase the molecular weight. The additional cyclic siloxane is often added slowly (e.g., drop wise). The reaction temperature is often conducted in the range of 80° C. to 90° C. with a reaction time of 5 to 7 hours. The resulting polydiorganosiloxane diamine can be of high purity (e.g., less than 2 weight percent, less than 1.5 weight percent, less than 1 weight percent, less than 0.5 weight percent, less than 0.1 weight percent, less than 0.05 weight percent, or less than 0.01 weight percent silanol impurities). Altering the ratio of the amine end functional blocker to the cyclic siloxane can be used to vary the molecular weight of the resulting polydiorganosiloxane diamine of Formula III.

Another method of preparing the polydiorganosiloxane diamine of Formula III includes combining under reaction conditions and under an inert environment (a) an amine functional end blocker of the following formula

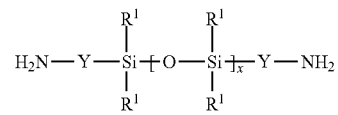

where $R^1$ and Y are the same as described for Formula I (I-a or I-b) and where the subscript x is equal to an integer of 1 to 150; (b) sufficient cyclic siloxane to obtain a polydiorganosiloxane diamine having an average molecular weight greater than the average molecular weight of the amine functional end blocker; and (c) a catalyst selected from cesium hydroxide, cesium silanolate, rubidium silanolate, cesium polysiloxanolate, rubidium polysiloxanolate, and mixtures thereof. The reaction is continued until substantially all of the amine functional end blocker is consumed. This method is further described in U.S. Pat. No. 6,355,759 B1 (Sherman et al.). This procedure can be used to prepare any molecular weight of the polydiorganosiloxane diamine.

Yet another method of preparing the polydiorganosiloxane diamine of Formula III is described in U.S. Pat. No. 6,531,620

B2 (Brader et al.). In this method, a cyclic silazane is reacted with a siloxane material having hydroxy end groups as shown in the following reaction.

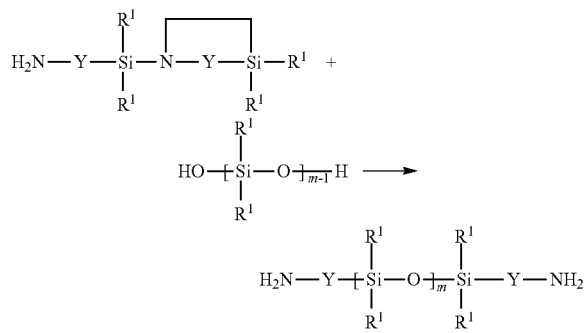

The groups $R^1$ and Y are the same as described for Formula I (I-a or I-b). The subscript m is an integer greater than 1.

Examples of polydiorganosiloxane diamines include, but are not limited to, polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and mixtures thereof.

In Reaction Scheme B, an oxalate of Formula IV is reacted with the polydiorganosiloxane diamine of Formula III under an inert atmosphere. The two $R^2$ groups in the oxalate of Formula IV can be the same or different. In some methods, the two $R^2$ groups are different and have different reactivity with the polydiorganosiloxane diamine of Formula III in Reaction Scheme B.

Group $R^2$ can be an alkyl, haloalkyl, aryl, or aryl substituted with an alkyl, alkoxy, halo, or alkoxycarbonyl. Suitable alkyl and haloalkyl groups for $R^2$ often have 1 to 10, 1 to 6, or 1 to 4 carbon atoms. Although tertiary alkyl (e.g., tert-butyl) and haloalkyl groups can be used, there is often a primary or secondary carbon atom attached directly (i.e., bonded) to the adjacent oxy group. Exemplary alkyl groups include methyl, ethyl, n-propyl, iso-propyl, n-butyl, and iso-butyl. Exemplary haloalkyl groups include chloroalkyl groups and fluoroalkyl groups in which some, but not all, of the hydrogen atoms on the corresponding alkyl group are replaced with halo atoms. For example, the chloroalkyl or a fluoroalkyl groups can be chloromethyl, 2-chloroethyl, 2,2,2-trichloroethyl, 3-chloropropyl, 4-chlorobutyl, fluoromethyl, 2-fluoroethyl, 2,2,2-trifluoroethyl, 3-fluoropropyl, 4-fluorobutyl, and the like. Suitable aryl groups for $R^2$ include those having 6 to 12 carbon atoms such as, for example, phenyl. An aryl group can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), or alkoxycarbonyl (e.g., an alkoxycarbonyl having 2 to 5 carbon atoms such as methoxycarbonyl, ethoxycarbonyl, or propoxycarbonyl).

The oxalates of Formula IV in Reaction Scheme B can be prepared, for example, by reaction of an alcohol of formula $R^2$—OH with oxalyl dichloride. Commercially available oxalates of Formula IV (e.g., from Sigma-Aldrich, Milwaukee, Wis. and from VWR International, Bristol, Conn.) include, but are not limited to, dimethyl oxalate, diethyl oxalate, di-n-butyl oxalate, di-tert-butyl oxalate, bis(phenyl) oxalate, bis(pentafluorophenyl)oxalate, 1-(2,6-difluorophenyl)-2-(2,3,4,5,6-pentachlorophenyl)oxalate, and bis(2,4,6-trichlorophenyl)oxalate.

A molar excess of the oxalate is used in Reaction Scheme B. That is, the molar ratio of oxalate to polydiorganosiloxane diamine is greater than the stoichiometric molar ratio, which is (p+1):p. The molar ratio is often greater than 2:1, greater than 3:1, greater than 4:1, or greater than 6:1. The condensation reaction typically occurs under an inert atmosphere and at room temperature upon mixing of the components.

The condensation reaction used to produce the precursor of Formula II (i.e., Reaction Scheme B) can occur in the presence or absence of a solvent. In some methods, no solvent or only a small amount of solvent is included in the reaction mixture. In other methods, a solvent may be included such as, for example, toluene, tetrahydrofuran, dichloromethane, or aliphatic hydrocarbons (e.g., alkanes such as hexane).

Removal of excess oxalate from the precursor of Formula II prior to reaction with the diamine in Reaction Scheme A tends to favor formation of an optically clear polydiorganosiloxane polyamide. The excess oxalate can typically be removed from the precursor using a stripping process. For example, the reacted mixture (i.e., the product or products of the condensation reaction according to Reaction Scheme B) can be heated to a temperature up to 150° C., up to 175° C., up to 200° C., up to 225° C., or up to 250° C. to volatilize the excess oxalate. A vacuum can be pulled to lower the temperature that is needed for removal of the excess oxalate. The precursor compounds of Formula II tend to undergo minimal or no apparent degradation at temperatures in the range of 200° C. to 250° C. or higher. Any other known methods of removing the excess oxalate can be used.

The by-product of the condensation reaction shown in Reaction Scheme B is an alcohol (i.e., $R^2$—OH is an alcohol). Group $R^2$ is often limited to an alkyl having 1 to 4 carbon atoms, a haloalkyl having 1 to 4 carbon atoms, or an aryl such as phenyl that form an alcohol that can be readily removed (e.g., vaporized) by heating at temperatures no greater than 250° C. Such an alcohol can be removed when the reacted mixture is heated to a temperature sufficient to remove the excess oxalate of Formula IV.

Optional Additives

Functional components, tackifiers, plasticizers, and other property modifiers may be incorporated in the thermoplastic component, the silicone-polyoxamide PA component, or both of the components of the presently disclosed mixtures. Preferred optional additives are not hot melt processable. That is, they do not melt and flow at the temperatures at which the hot melt processable thermoplastic component and the silicone-polyoxamide PA component melt and flow.

Functional components include, for example, antistatic additives, ultraviolet light absorbers (UVAs), hindered amine light stabilizers (HALS), dyes, colorants, pigments, antioxidants, slip agents, low adhesion materials, conductive materials, abrasion resistant materials, optical elements, dimensional stabilizers, adhesives, tackifiers, flame retardants, phosphorescent materials, fluorescent materials, nanoparticles, anti-graffiti agents, dew-resistant agents, load bearing agents, silicate resins, synergists, fumed silica, glass beads, glass bubbles, glass fibers, mineral fibers, clay particles, organic fibers, e.g., nylon, KEVLAR, metal particles, and the like. Such optional additives can be added in amounts up to 100 parts per 100 parts of the sum of the thermoplastic component and the silicone-polyoxamide PA component, provided that if and when incorporated, such additives are not detrimental to the function and functionality of the final mixture and/or articles derived therefrom. The synergist may include polyoxyethylene glycol and polycaprolactone. Other additives such as light diffusing materials, light absorptive materials and optical brighteners, flame retardants, stabilizers, antioxidants, compatibilizers, antimicrobial agents such as zinc oxide, electrical conductors, thermal conductors such as aluminum oxide, boron nitride, aluminum nitride, and nickel particles, including organic and/or inorganic particles, or any number or combination thereof, can be blended into these systems. The functional components listed above may also be incorporated into the silicone-polyoxamide PA component provided such incorporation does not adversely affect any of the resulting product to an undesirable extent.

Processes of Making Compositions and Constructions

The presently disclosed compositions and constructions can be made by solvent-based processes known to the art, by a solventless process, or by a combination of the two.

One skilled in the art can expect the optimum mixture to be a function of the architecture and ratios of the silicone-polyoxamide PA component, the architecture and ratios of the thermoplastic component, optional initiator architecture, and whether any functional components, additives, or property modifiers are added.

The thermoplastic component is generally added as a molten stream to the silicone-polyoxamide PA component or to one of the reactants of the silicone-polyoxamide PA component. Sometimes the thermoplastic component needs to be melted in a separate vessel before the silicone-polyoxamide PA component is added (1) as pellets, (2) as reactants or (3) as a separate molten stream from a second vessel. Examples when a separate vessel is preferred include, for example, when (1) additives are preferred to concentrate in the thermoplastic component, (2) thermoplastic component(s) require high processing temperatures, It would be easier to remove these. We have no data on thermosets and the molding process is different, The order of adding the various components is important in forming the mixture. If the thermoplastic component is substantially unreactive with the reactants for making the silicone-polyoxamide PA as discussed earlier, any order of addition can be used. The silicone-polyoxamide PA component can be added to the thermoplastic component, and vice versa, or the silicone-polyoxamide PA component can be made in the presence of the thermoplastic component. However, the thermoplastic component must be added after the silicone-polyoxamide PA component is formed if the thermoplastic component is reactive with the reactants for making such silicone-polyoxamide PA component. Also, the thermoplastic component is preferably sufficiently heated to a processable state in a separate vessel and added to a molten stream of the silicone-polyoxamide PA component if the temperature needed to process the thermoplastic component would degrade the silicone-polyoxamide PA component.

Other additives such as plasticizing materials, tackifying materials, pigments, fillers, initiators, and the like can generally be added at any point in the process since they are usually not reactive with the reactants but are typically added after a substantial amount of the silicone-polyoxamide PA component is formed.

Four process considerations can affect the final properties of the mixtures made by the solventless process. First, the properties of silicone-polyoxamide PA component could be affected by whether the silicone-polyoxamide PA component is made in a solvent or an essentially solventless process. Second, the silicone-polyoxamide PA component can degrade if exposed to too much heat and shear. Third, the stability of the mixture is affected by how the silicone-polyoxamide PA component is mixed with the thermoplastic component. Fourth, the morphology of the article made with the mixture is determined by the interaction of the processing parameters and characteristics of the components in the mixture.

In a first consideration, the silicone-polyoxamide PA component can be made previously by either a solvent or solventless process or can be made in the presence of the thermoplastic component. Methods of making the silicone-polyoxamide PA component in solvent were disclosed above. Methods of making the silicone-polyoxamide PA component in substantially solventless conditions can result in silicone-polyoxamide PA component high in molecular weight.

In a second consideration, the silicone-polyoxamide PA component can degrade if it is heated too much under shear conditions, particularly in the presence of oxygen. The silicone-polyoxamide PA component is exposed to the least amount of heat and shear when made in the presence of the thermoplastic component, and in particular, when the mixture is made under an inert atmosphere.

In a third consideration, the stability of the mixture is affected by how the silicone-polyoxamide PA component is mixed with the thermoplastic component. Silicone-polyoxamide PA's are generally immiscible with most other polymeric materials. However, the inventors have found that a wide variety of polymers can be mixed with a silicone-polyoxamide PA component when both are in the molten state. Care must be taken that the conditions needed to soften one component does not degrade the other. Preferably, the mixing temperature should be at a temperature above the mixing and conveying temperature of the mixture and below the degradation temperature of the silicone-polyoxamide PA component. The silicone-polyoxamide PA component can usually be subjected to elevated temperatures up to 250° C. or higher without apparent degradation.

Any vessel in which the components can be adequately heated and mixed in the molten state is suitable for making mixtures of the invention.

In a fourth consideration, the processing steps influence the morphology of an article made with the mixtures of the invention. The mixtures generally have at least two domains, one discontinuous and the other continuous, because of the general immiscibility of the silicone-polyoxamide PA component with the thermoplastic component. The component comprising the minor phase typically forms discontinuous domains that range in shape from spheroidal to ellipsoidal to ribbon-like to fibrous. The component comprising the major phase typically forms the continuous domain that surrounds the discontinuous domains. The discontinuous domains of the mixture generally elongate if the mixture is subjected to sufficient shear or extensional forces as the mixture is formed into an article. The discontinuous domains generally remain elongated if at least one of the components has a sufficient viscosity at use temperature to prevent the elongated domain from relaxing into a sphere when the mixture is no longer under extensional or shear forces. The elongated morphology is usually stable until the mixture is reheated above the softening point of the components.

While both a solvent based process and a solventless process for making the presently disclosed mixtures, there may be some situations where a combination of the two is preferred. In the latter case, the silicone-polyoxamide PA component could be made by the solvent based process and subsequently dried and melt mixed with the thermoplastic component.

Various articles can be made using the disclosed mixtures. These articles can be made by various methods, including, melt mixing the thermoplastic component and the thermoplastic silicone-polyoxamide PA component to form a mixture, and extruding the mixture. Melt mixing can done by batch blending or extrusion.

These articles include an extruded film, a bottle, a sheet or a tube, and the like. The presently disclosed articles have a haze that is less than 5% when measured through a thickness of about 0.60 mm. Haze can be measured using a Haze-Gard Plus hazemeter available from BYK-Gardner USA, Columbia, Md.

Examples

The following examples are merely for illustrative purposes and are not meant to limit in any way the scope of the appended claims. All parts, percentages, ratios, and the like in the examples are by weight, unless noted otherwise.

Materials

Two thermoplastics were used: a 1.5 MFR, 0.90 grams per cubic centimeter (cc) density polypropylene random copolymer available from Huntsman Corporation, The Woodlands, Tex. (now 23 T1Acs315 available from Flint Hill Resources, Wichita, Kans.) and THV 500, a terpolymer of hexafluoropropylene, tetrafluoroethylene, and vinylidene fluoride available from Dyneon LLC (Oakdale, Minn.). Sources for the various materials used are listed below.

hydrochloric acid added during titration. The equivalent weight (grams/equivalent) was equal to the sample weight of the precursor divided by the number of equivalents of the precursor.

Optical Properties Measurement

The refractive index was measured using an Abbe Refractometer available from Atago Co., Ltd., Tokyo, Japan. The samples were pressed into thin film using a heated press and placed directly on the refractometer crystal. When the sample was too rigid to offer good contact, an immersion oil ($n_D$=1.515) was used between the sample and the crystal.

The haze was measured using a Haze-Gard Plus hazemeter available from BYK-Gardner USA, Columbia, Md. Haze is a function of the type of thermoplastic and the eight percent of PA based on the total weight of the mixture. The haze data presented below is based on 1 wt % PA based on the total weight of the mixture for the exemplified thermoplastics.

Viscosity Measurement

The zero shear viscosity was measured using an Advanced Rheometric Expansion System ("ARES") rheometer available from Rheometric Scientific Inc., Piscataway, N.J. The samples were first molded into a plaque, using a hot press and then cut to the appropriate dimensions.

An isothermal frequency sweep was performed at various temperatures, between 100° C. and 300° C., using parallel Table of Materials

| Acronym | Description |
| --- | --- |
| PA-1 | A fluoropolymer commercially available under the trade designation "FX-5911" from Dyneon LLC, Oakdale, MN |
| PA-2 | A polydimethyl silicone commercially available under the trade designation "DMS-T72" from Gelest, Inc., Morrisville, PA. |
| PA-4 | A silicone polyoxamide polymer referred to as "33K S Polymer" preparable according to the previously disclosed methods |
| PA-5 | A silicone polyoxamide polymer referred to as "25K S Polymer" preparable according to the previously disclosed methods |
| PA-6 | A silicone polyoxamide polymer referred to as "14K S Polymer" preparable according to the previously disclosed methods |
| PA-7 | A silicone polyoxamide polymer referred to as "Phenyl, Me S POLYMER" preparable according to the previously disclosed methods. |
| PA-8 | A silicone polyoxamide polymer referred to as "Phenyl, Me S POLYMER" preparable according to the previously disclosed methods. |
| PA-9 | A linear low density polyethylene commercially available under the trade designation "EM 1001.32" from ExxonMobil Company, Houston, TX. |
| H-1 | A polypropylene commercially available under the trade designation "23T1Acs315" from Huntsman Corp., The Woodlands, TX. |
| H-2 | A thermoplastic comprising a terpolymer of tetrafluoroethylene, hexafluoropropylene and vinylidene fluoride commercially available under the trade designation "THV 500" from Dyneon LLC, Oakdale, MN |

Experimental Methods

Titration Method to Determine Ester Equivalent Weight

Ten (10) grams (precisely weighed) of the ester capped silicone was added to a jar. Approximately 50 grams THF solvent (not precisely weighed) was added. The contents were mixed using a magnetic stir bar mix until the mixture was homogeneous. The theoretical equivalent weight of precursor was calculated and then an amount of N-hexylamine (precisely weighed) in the range of 3 to 4 times this number of equivalents was added. The reaction mixture was stirred for a minimum of 4 hours. Bromophenol blue (10-20 drops) was added and the contents were mixed until homogeneous. The mixture was titrated to a yellow endpoint with 1.0N (or 0.1N) hydrochloric acid. The number of equivalents of precursor was equal to the number of equivalents of N-hexylamine added to the sample minus the number of equivalents of plates with a radius of 12.5 mm and a gap of about 1.0 mm. Viscosity, $\eta'$ and $\eta^*$, versus shear rate data were recorded in all cases. For each sample, at least six temperatures were selected for a frequency sweep. The validity of the results was verified using a Cole-Cole plot and unreliable data were rejected. In each case, the results from at least four temperatures were found to be adequate for further calculations. From this data, a master-curve at 190° C. was obtained and the zero shear viscosity was extrapolated using the Carreau-Yasuda equation. The log of this value is reported below.

Performance Measurement

The pressure reduction was measured using a Rosand capillary rheometer with a 1 mm diameter flat entry die and a L/D=16. In each case, for the thermoplastic H-1, the material was extruded until stable pressure was reached. A shear rate of 400/s was used for the 230° C. measurements and a shear rate of 100/s was used for the 210° C. measurements. At that point, the shear rate was set to 40/s and the pressure allowed to equilibrate. The shear rate was successively increased to 60/s, 100/s, 150/s, 250/s, 400/s, and 600/s and allowed to equilibrate in each case. The pressure obtained with the PA containing formulation was compared to the pressure of the virgin resin and the % pressure reduction was calculated.

For thermoplastic H-2, the test temperature was 265° C. The shear rate sequence is given in Table 2. The severity of the melt fracture (MF) was visually assessed and ranked from: No MF present to Severe MF.

EXAMPLES

Example 1

An ester capped silicone was prepared from a commercial silicone diamine. A sample of 4.3K phenyl/methyl modified PDMS diamine, (X-22-1660B-3, available from Shin-Etsu Silicones of America, Inc. Akron, Ohio, USA.), (592.9 grams) was placed in a 2-liter, 3-neck resin flask equipped with a mechanical stirrer, heating mantle, nitrogen inlet tube (with stopcock), and an outlet tube. The flask was purged with nitrogen for 15 minutes and then, with vigorous stirring, diethyl oxalate (101.34 grams) was added dropwise. This reaction mixture was stirred for approximately one hour at room temperature and then for 75 minutes at 80° C. The reaction flask was fitted with a distillation adaptor and receiver. The reaction mixture was heated under vacuum (133 Pascals, 1 Torr) for 2 hours at 120° C. and then 30 minutes at 130° C., until no further distillate was able to be collected. The reaction mixture was cooled to room temperature. Gas chromatographic analysis of the clear, mobile liquid showed that no detectable level of diethyl oxalate remained. The ester equivalent weight was determined by titration (equivalent weight equal to 2,253 grams/equivalent).

The ester capped silicone (435.88 grams) was placed in a 32-ounce wide mouth jar. EDA (5.84 grams) was added. The jar was sealed and the mixture was rapidly agitated until the contents became too viscous to flow. After sitting overnight at ambient temperature, the solid product was dissolved in THF (200 grams). A film was cast by pouring the solution into a Petri dish and then by slowly evaporating the THF overnight at ambient temperature. The polyphenylmethylsiloxane polyoxamide was a clear elastomeric film (PA-8).

PA-8 was compounded in thermoplastic H-1 by first preparing a 10% masterbatch in a system available under the trade designation "Haake Rheocord 90" from Haake, Inc., Saddle Brook, N.J. and using a mixer commercially available under the trade designation "Rheomix 600" from BASF Construction Chemicals, LLC where mixing was done with sigma blades at 190° C. for 8 minutes. 4.5 grams of PA-8 was blended with 40.5 grams of thermoplastic H-1. The mixing speed was set at 15 RPM for the first 2 minutes, ramped to 50 RPM over one minute and maintained at that speed for the remaining 5 minutes.

The same procedure was used to prepare haze samples, except that the weight percent of PA-8 was 1 wt % based on the weight of the mixture. 1 wt % of PA-8 was used to emphasize the light scattering caused by the additive. In this case, 0.45 grams of the PA-8 was blended with 44.55 grams of thermoplastic H-1. The resulting mixture of PA-8 and H-1 was then pressed down into 0.63 mm (25 mil) sheets, using a heated press.

The 10% master batch mass was cooled, chopped and ground. The masterbatch was diluted down to 1000 ppm (0.1%) by blending 594 grams of thermoplastic H-1 with 6 grams of the masterbatch. This mixture was flood fed to a counter rotating, intermeshing, conical twin screw extruder available from Haake, Saddle Brook, N.J. with a screw speed of 50 RPM. The extruder temperatures were set at 200° C. except the feed zone that was kept at 180° C. The mixture was extruded twice to ensure uniformity. Results for refractive index, haze, viscosity and pressure reduction over CE-1, which contains no PA, are summarized in Table 1 below.

Example 2

PA-7 would be prepared according to the following procedure. A 2 L resin kettle equipped with a mechanical stirrer, nitrogen inlet, thermocouple, ¼" stainless steel dip tube, and heating mantle would be charged with diethyl oxalate (22.7 g, 155 mmol). A silicone diamine in which ~10 mole percent of the pendant groups are phenyl, containing ~13 weight percent volatile cyclic species, and having an amine equivalent weight of 19,317 g/mole (600 grams) would be added to the vessel over about 30 minutes with vigorous stirring. The reaction flask would be fitted with a distillation adaptor and receiver, and vacuum would be applied (<133 Pascals). The internal temperature would be brought to 150° C., collecting the bulk of the distillate in the receiver. Once the internal temperature reaches 150° C., a subsurface nitrogen purge would be introduced through the dip tube and held for 1 h until little to no additional distillate was observed. The reaction mixture would be cooled to room temperature. Gas chromatographic analysis of the clear, mobile liquid showed that no detectable level of diethyl oxalate remained. The ester equivalent weight would be determined by titration (equivalent weight would be equal to 16900 grams/equivalent).

A sample of the ester capped silicone would be weighed into a wide mouth 16 oz jar (95.50 g). An equimolar amount of EDA (170 mg) would be added. The jar would be sealed and the mixture was rapidly agitated until the contents became too viscous to flow. After sitting for four days at ambient temperature, the solid product would be dissolved in THF (280 grams). A film would be cast by pouring the solution into a Teflon tray and then by slowly evaporating the THF overnight at ambient temperature. The polyphenylmethylsiloxane polyoxamide would be a clear elastomeric film. Final drying would be achieved in a 150° C. vacuum oven for 48 h.

PA-7 prepared according to the method above would be compounded in thermoplastic H-1 by first preparing a 10% masterbatch in a system available under the trade designation "Haake Rheocord 90" from Haake, Inc., Saddle Brook, N.J. and using a mixer commercially available under the trade designation "Rheomix 600" from BASF Construction Chemicals, LLC where mixing would be done with sigma blades at 190° C. for 8 minutes. 4.5 grams of PA-7 would be blended with 40.5 grams of thermoplastic H-1. The mixing speed would be set at 15 RPM for the first 2 minutes, ramped to 50 RPM over one minute and maintained at that speed for the remaining 5 minutes.

The same procedure would be used to prepare haze samples, except that the weight percent of PA-7 would be 1 wt % based on the weight of the mixture. 1 wt % of PA-7 would be used to emphasize the light scattering caused by the additive. In this case, 0.45 grams of the PA-7 would be blended with 44.55 grams of thermoplastic H-1. 5 grams of the resulting mixture of PA-7 and H-1 would then be pressed down into 0.63 mm (25 mil) sheets, using a heated press.

The 10% master batch mass would be cooled, chopped and ground. The masterbatch would be diluted down to 1000 ppm (0.1%) by blending 594 grams of thermoplastic H-1 with 6 grams of the masterbatch. This mixture would be flood fed to a counter rotating, intermeshing, conical twin screw extruder available from Haake, Saddle Brook, N.J., with a screw speed of 50 RPM. The extruder temperatures would be set at 200° C. except the feed zone that was kept at 180° C. The mixture would be extruded twice to ensure uniformity. Anticipated results for refractive index, haze, viscosity and pressure reduction over CE-1, which contains no PA, are summarized in Table 1 below.

Comparative Example 1

The thermoplastic H-1 was tested using the same conditions for Ex. 1. Results for refractive index, haze and viscosity for CE-1 are summarized in Table 1 below.

Comparative Example 2

PA-1 was compounded in thermoplastic H-1 by first preparing a 10% masterbatch in a system available under the trade designation "Haake Rheocord 90" from Haake, Inc., Saddle Brook, N.J. and using a mixer commercially available under the trade designation "Rheomix 600" from BASF Construction Chemicals, LLC where mixing was done with sigma blades at 190° C. for 8 minutes. 4.5 grams of PA-1 was blended with 40.5 grams of thermoplastic H-1. The mixing speed was set at 15 RPM for the first 2 minutes, ramped to 50 RPM over one minute and maintained at that speed for the remaining 5 minutes.

The same procedure was used to prepare haze samples, except that the weight percent of PA-1 was 1 wt % based on the weight of the mixture. 1 wt % of PA-8 was used to emphasize the light scattering caused by the additive. In this case, 0.45 grams of the PA-1 was blended with 44.55 grams of thermoplastic H-1. 5 grams of the resulting mixture of PA-1 and H-1 was then pressed down into 0.63 mm (25 mil) sheets, using a heated press.

The 10% master batch mass was cooled, chopped and ground. The masterbatch was diluted down to 1000 ppm (0.1%) by blending 594 grams of thermoplastic H-1 with 6 grams of the masterbatch. This mixture was flood fed to a counter rotating, intermeshing, conical twin screw extruder available from Haake, Saddle Brook, N.J., with a screw speed of 50 RPM. The extruder temperatures were set at 200° C. except the feed zone that was kept at 180° C. The mixture was extruded twice to ensure uniformity. Results for refractive index, haze, viscosity and pressure reduction over CE-1, which contains no PA, are summarized in Table 1 below.

Comparative Example 3

PA-2 was compounded in thermoplastic H-1 by first preparing a 10% masterbatch in a system available under the trade designation "Haake Rheocord 90" from Haake, Inc., Saddle Brook, N.J. and using a mixer commercially available under the trade designation "Rheomix 600" from BASF Construction Chemicals, LLC where mixing was done with sigma blades at 190° C. for 8 minutes. 4.5 grams of PA-2 was blended with 40.5 grams of thermoplastic H-1. The mixing speed was set at 15 RPM for the first 2 minutes, ramped to 50 RPM over one minute and maintained at that speed for the remaining 5 minutes.

The same procedure was used to prepare haze samples, except that the weight percent of PA-2 was 1 wt % based on the weight of the mixture. 1 wt % of PA-2 was used to emphasize the light scattering caused by the additive. In this case, 0.45 grams of the PA-2 was blended with 44.55 grams of thermoplastic H-1. 5 grams of the resulting mixture of PA-2 and H-1 was then pressed down into 0.63 mm (25 mil) sheets, using a heated press.

The 10% master batch mass was cooled, chopped and ground. The masterbatch was diluted down to 1000 ppm (0.1%) by blending 594 grams of thermoplastic H-1 with 6 grams of the masterbatch. This mixture was flood fed to a counter rotating, intermeshing, conical twin screw extruder available from Haake, Saddle Brook, N.J., with a screw speed of 50 RPM. The extruder temperatures were set at 200° C. except the feed zone that was kept at 180° C. The mixture was extruded twice to ensure uniformity. Results for refractive index, haze, viscosity and pressure reduction over CE-1, which contains no PA, are summarized in Table 1 below.

Comparative Example 4

PA-4 was compounded in thermoplastic H-1 by first preparing a 10% masterbatch in a system available under the trade designation "Haake Rheocord 90" from Haake, Inc., Saddle Brook, N.J. and using a mixer commercially available under the trade designation "Rheomix 600" from BASF Construction Chemicals, LLC where mixing was done with sigma blades at 190° C. for 8 minutes. 4.5 grams of PA-4 was blended with 40.5 grams of thermoplastic H-1. The mixing speed was set at 15 RPM for the first 2 minutes, ramped to 50 RPM over one minute and maintained at that speed for the remaining 5 minutes.

The same procedure was used to prepare haze samples, except that the weight percent of PA-4 was 1 wt % based on the weight of the mixture. 1 wt % of PA-4 was used to emphasize the light scattering caused by the additive. In this case, 0.45 grams of the PA-4 was blended with 44.55 grams of thermoplastic H-1. 5 grams of the resulting mixture of PA-4 and H-1 was then pressed down into 0.63 mm (25 mil) sheets, using a heated press.

The 10% master batch mass was cooled, chopped and ground. The masterbatch was diluted down to 1000 ppm (0.1%) by blending 594 grams of thermoplastic H-1 with 6 grams of the masterbatch. This mixture was flood fed to a counter rotating, intermeshing, conical twin screw extruder available from Haake, Saddle Brook, N.J., with a screw speed of 50 RPM. The extruder temperatures were set at 200° C. except the feed zone that was kept at 180° C. The mixture was extruded twice to ensure uniformity. Results for refractive index, haze, viscosity and pressure reduction over CE-1, which contains no PA, are summarized in Table 1 below.

Comparative Example 5

PA-5 was compounded in thermoplastic H-1 by first preparing a 10% masterbatch in a system available under the trade designation "Haake Rheocord 90" from Haake, Inc., Saddle Brook, N.J. and using a mixer commercially available under the trade designation "Rheomix 600" from BASF Construction Chemicals, LLC where mixing was done with sigma blades at 190° C. for 8 minutes. 4.5 grams of PA-5 was blended with 40.5 grams of thermoplastic H-1. The mixing speed was set at 15 RPM for the first 2 minutes, ramped to 50 RPM over one minute and maintained at that speed for the remaining 5 minutes.

The same procedure was used to prepare haze samples, except that the weight percent of PA-5 was 1 wt % based on the weight of the mixture. 1 wt % of PA-5 was used to emphasize the light scattering caused by the additive. In this case, 0.45 grams of the PA-5 was blended with 44.55 grams of thermoplastic H-1. 5 grams of the resulting mixture of PA-5 and H-1 was then pressed down into 0.63 mm (25 mil) sheets, using a heated press.

The 10% master batch mass was cooled, chopped and ground. The masterbatch was diluted down to 1000 ppm (0.1%) by blending 594 grams of thermoplastic H-1 with 6 grams of the masterbatch. This mixture was flood fed to a counter rotating, intermeshing, conical twin screw extruder available from Haake, Saddle Brook, N.J., with a screw speed of 50 RPM. The extruder temperatures were set at 200° C. except the feed zone that was kept at 180° C. The mixture was extruded twice to ensure uniformity. Results for refractive index, haze, viscosity and pressure reduction over CE-1, which contains no PA, are summarized in Table 1 below.

Comparative Example 6

PA-6 was compounded in thermoplastic H-1 by first preparing a 10% masterbatch in a system available under the trade designation "Haake Rheocord 90" from Haake, Inc., Saddle Brook, N.J. and using a mixer commercially available under the trade designation "Rheomix 600" from BASF Construction Chemicals, LLC where mixing was done with sigma blades at 190° C. for 8 minutes. 4.5 grams of PA-6 was blended with 40.5 grams of thermoplastic H-1. The mixing speed was set at 15 RPM for the first 2 minutes, ramped to 50 RPM over one minute and maintained at that speed for the remaining 5 minutes.

The same procedure was used to prepare haze samples, except that the weight percent of PA-6 was 1 wt % based on the weight of the mixture. 1 wt % of PA-6 was used to emphasize the light scattering caused by the additive. In this case, 0.45 grams of the PA-6 was blended with 44.55 grams of thermoplastic H-1. 5 grams of the resulting mixture of PA-6 and H-1 was then pressed down into 0.63 mm (25 mil) sheets, using a heated press.

The 10% master batch mass was cooled, chopped and ground. The masterbatch was diluted down to 1000 ppm (0.1%) by blending 594 grams of thermoplastic H-1 with 6 grams of the masterbatch. This mixture was flood fed to a counter rotating, intermeshing, conical twin screw extruder available from Haake, Saddle Brook, N.J., with a screw speed of 50 RPM. The extruder temperatures were set at 200° C. except the feed zone that was kept at 180° C. The mixture was extruded twice to ensure uniformity. Results for refractive index, haze, viscosity and pressure reduction over CE-1, which contains no PA, are summarized in Table 1 below.

embodiments, it is preferable that the change in haze between the PA and the thermoplastic is less than 24 when adding 1 wt % PPA based on the total weight of the mixture.

Example 3

Example 3 was prepared into a masterbatch using the twin-screw compounding procedure followed in Example 1. In Example 3, the temperatures were 190° C., 220° C., 220° C., and 240° C. from the feed throat to the die. The material was starved feed at approximately 40 g/min and the screw speed was 50 RPM. Pellets of H-2 were blended with pellets of additive PA-4 and extruded into a masterbatch at a 2% concentration. This master batch was further diluted into H-2 to a level of 1000 ppm using the same temperatures, starve feed rate and screw speed as used in preparing the masterbatch. The S Polymer material used in Example 3 shows efficacy at delaying MF in H-2 and much lower haze than LLDPE according to data in U.S. Pat. No. 5,549,948 to Blong et al.

The same procedure as that described in Example 1 was used to prepare haze samples for Example 3. In preparing the haze samples, 1 gram of PA-4 was blended with 100 grams of thermoplastic H-2. 5 grams of the resulting blends were pressed down into 0.051 mm (20 mil) sheets, using a heated press. Table 2 summarizes MF appearance and pressure reduction at various shear rates for Example 3.

Comparative Example 7

In Comparative Example 7, the temperatures were 190° C., 220° C., 220° C., and 240° C. from the feed throat to the die. The material was starved feed at approximately 40 g/min and the screw speed was 50 RPM. The same procedure as that described in Example 1 was used to prepare haze samples for Comparative Example 7. In preparing the haze samples, 5 grams of thermoplastic H-2 were pressed down into 0.051 mm (20 mil) sheets, using a heated press. Table 2 summarizes MF appearance and pressure reduction at various shear rates for Example 3 compared to Comparative Example 7. Table 3 summarizes refractive index, change in refractive index based on refractive index of CE-7, and haze data.

Comparative Example 8

PA-9 was compounded in thermoplastic H-2 by first preparing a 10% masterbatch in a system available under the trade designation "Haake Rheocord 90" from Haake, Inc.,

TABLE 1

| Example | log Eta Zero (190° C.) Pa | RI | ΔRI | Haze | ΔHaze | Pressure reduction at 230° C. and 150/s % | Pressure reduction at 210° C. and 100/s % |
|---------|---------------------------|-------|-------|------|-------|-------------------------------------------|-------------------------------------------|
| Ex. 1   | 1.293                     | 1.508 | 0.006 | 26   | 6     | 6                                         | —                                         |
| Ex. 2   | 4.5                       | 1.455 | 0.047 | 30   | 10    | 20                                        | 20                                        |
| CE1     |                           | 1.502 | 0.00  | 20   | 0     | 0                                         | 0                                         |
| CE2     | 4.345                     | 1.360 | 0.142 | 97   | 77    | 19                                        | 18                                        |
| CE3     | 3.496                     | 1.406 | 0.096 | 44   | 24    | 1                                         | 1                                         |
| CE4     | 4.695                     | 1.407 | 0.095 | 86   | 66    | 18                                        | 19                                        |
| CE5     | 5.414                     | 1.408 | 0.094 | 89   | 69    | 11                                        | —                                         |
| CE6     | 3.557                     | 1.409 | 0.093 | 55   | 35    | 8                                         | 13                                        |

Efficacy of the various PA's to reduce pressure is a function of viscosity. The haziness is a function of both the RI and the viscosity. In some embodiments, in order to provide improvements in pressure reduction, it is preferable that mixtures have a viscosity above 3.5. and a ΔRI below 0.075. In some Saddle Brook, N.J. and using a mixer commercially available under the trade designation "Rheomix 600" from BASF Construction Chemicals, LLC where mixing was done with sigma blades at 190° C. for 8 minutes. 4.5 grams of PA-9 was blended with 40.5 grams of thermoplastic H-2. The mixing speed was set at 15 RPM for the first 2 minutes, ramped to 50 RPM over one minute and maintained at that speed for the remaining 5 minutes.

The same procedure was used to prepare haze samples, except that the weight percent of PA-8 was 1 wt % based on the weight of the mixture. 1 wt % of PA-8 was used to emphasize the light scattering caused by the additive. In this case, 0.45 grams of the PA-8 was blended with 44.55 grams of thermoplastic H-2. 5 grams of the resulting mixture of PA-8 and H-2 was then pressed down into 0.63 mm (25 mil) sheets, using a heated press.

The 10% master batch mass was cooled, chopped and ground. The masterbatch was diluted down to 1000 ppm (0.1%) by blending 594 grams of thermoplastic H-2 with 6 grams of the masterbatch. This mixture was flood fed to a counter rotating, intermeshing, conical twin screw extruder available from Haake, Saddle Brook, N.J., with a screw speed of 50 RPM. The extruder temperatures were set at 200° C. except the feed zone that was kept at 180° C. The mixture was extruded twice to ensure uniformity. Results for refractive index, haze, and change in refractive index over CE-7, which contains no PA, are summarized in Table 3 below.

TABLE 2

| Shear Rate (1/s) | CE-7 MF Appearance | Ex. 3 MF Appearance | Pressure Reduction at 265° C. (%) of Ex. 3 vs. CE-7 |
|---|---|---|---|
| 25 | None | None | 7 |
| 50 | None | None | 2 |
| 100 | Slight | Slight | 5 |
| 250 | Moderate | Slight | 17 |
| 500 | Severe | None | 19 |
| 750 | Severe | None | 15 |
| 1000 | Severe | Moderate | 16 |

TABLE 3

|  | RI | ΔRI | Haze | ΔHAZE |
|---|---|---|---|---|
| CE7 | 1.357 | 0 | 13 | 0 |
| CE8 | 1.515 | 0.158 | 103 | 90 |
| Ex. 3 | 1.407 | 0.050 | 43 | 30 |

Efficacy of the various PA's to reduce pressure is a function of viscosity. The haziness is a function of both the RI and the viscosity. In some embodiments, it is preferable that the change in haze between the PA and the thermoplastic is less than 30 when adding 1 wt % PPA based on the total weight of the mixture.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A composition comprising a silicone-polyoxamide process additive, a synergist comprising polyoxyethylene glycol, and a thermoplastic with the proviso that the silicone-polyoxamide process additive is not acrylic modified;

wherein the refractive index difference between the silicone-polyoxamide process additive and the thermoplastic is less than about 0.07; and wherein the weight percent of the silicone-polyoxamide process additive based on the total weight of the composition is 0.01 wt % to 5.0 wt %.

2. The composition of claim 1 wherein the silicone-polyoxamide process additive is selected from:

(a) at least one copolymer comprising at least two repeat units of Formula I-a:

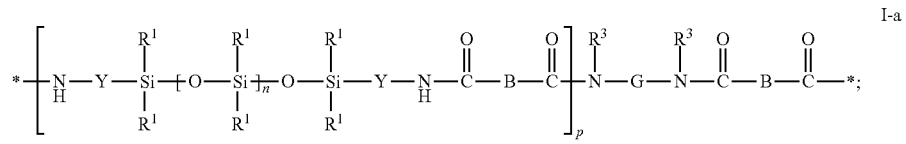

(b) at least one copolymer comprising at least two repeat units of Formula I-b:

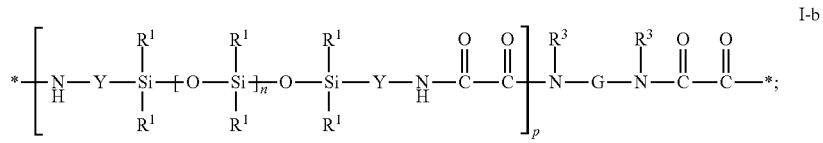

(c) and combinations thereof wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; G is a divalent residue; each group B is selected from a covalent bond, an alkylene of 4-20 carbons, an aralkylene, an arylene, or a combination thereof; n is an integer of 0 to 1500; and p is an integer of 1 to 10.

3. The composition of claim 2 wherein the divalent residue is derived from a diamine having the formula R3HN-G-NHR3, wherein R3 is selected from a hydrogen and an alkyl.

4. The composition of claim 3 wherein the diamine is a heterocyclic group.

5. The composition of claim 1 wherein the silicone-polyoxamide process additive has a molecular weight greater than 50,000.

6. The composition of claim 1 wherein the silicone-polyoxamide process additive polymer has a viscosity of greater than 3160 Pa.

7. The composition of claim 1 wherein the weight percent of the silicone-polyoxamide process additive is 0.01 wt % to 1.0% wt %.

8. The composition of claim 1 wherein the thermoplastic is selected from polypropylenes, polystyrenes, polyethylenes, polyesters, and combinations thereof.

9. The composition of claim 8 wherein the thermoplastic is a polypropylene.

10. An article comprising the composition of claim 1, wherein the article is an extruded film, a bottle, a sheet or a tube.

11. A method of making the article of claim 10 comprising:
   a. melt mixing the thermoplastic and the silicone-polyoxamide process additive to form a mixture;
   b. extruding the mixture.

12. The method of claim 11 wherein the melt mixing step is done by batch blending or extrusion.

13. The method of claim 11 wherein the silicone-polyoxamide process additive is selected from
   (a) at least one copolymer comprising at least two repeat units of Formula I-a:

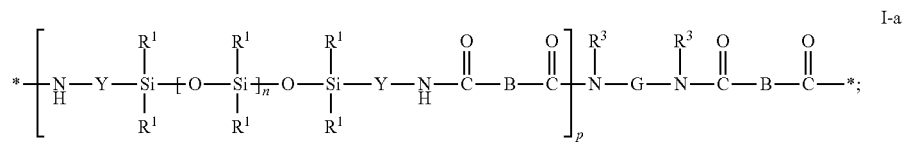

(b) at least one copolymer comprising at least two repeat units of Formula I-b:

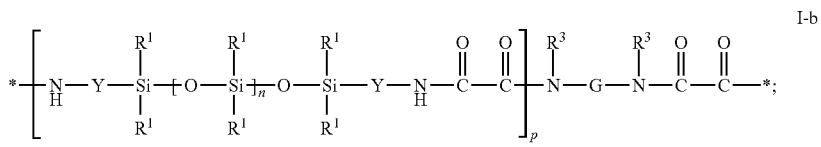

(c) and combinations thereof
   wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; G is a divalent residue; each group B is selected from a covalent bond, an alkylene of 4-20 carbons, an aralkylene, an arylene, or a combination thereof; n is an integer of 0 to 1500; and p is an integer of 1 to 10.

14. The method of claim 13 wherein the divalent residue is derived from a diamine having the formula R3HN-G-NHR3, wherein R3 is selected from a hydrogen and an alkyl.

15. The method of claim 14 wherein the diamine is a heterocyclic group.

* * * * *

UNITED STATES PATENT AND TRADEMARK OFFICE
CERTIFICATE OF CORRECTION

PATENT NO.        : 8,546,507 B2                                      Page 1 of 1
APPLICATION NO.   : 13/129722
DATED             : October 1, 2013
INVENTOR(S)       : Claude Lavallee It is certified that error appears in the above-identified patent and that said Letters Patent is hereby corrected as shown below:

In the Specification

Column 6
Line 45, Delete "URETHENE" and insert -- URETHANE --, therefor.

Column 8
Line 25, Delete "thereof" and insert -- thereof. --, therefor.
Line 28, Delete "thereof" and insert -- thereof. --, therefor.

Column 19
Line 35, Delete "different," and insert -- different. --, therefor.

Column 27
Line 67, Delete "3.5." and insert -- 3.5 --, therefor.

In the Claims

Column 31
Line 13, In Claim 7, delete "1.0% wt %." and insert -- 1.0 wt %. --, therefor.

Signed and Sealed this
Tenth Day of June, 2014

Michelle K. Lee
*Deputy Director of the United States Patent and Trademark Office*